US008185915B2

United States Patent
Bash et al.

(10) Patent No.: US 8,185,915 B2
(45) Date of Patent: May 22, 2012

(54) META-ARCHITECTURE FOR MULTI-TIERED ENTERPRISE SOFTWARE APPLICATION AND SYSTEM

(75) Inventors: Lee B. Bash, Oakdale, PA (US); David Disciascio, Coraopolis, PA (US)

(73) Assignee: Computer Associates Think, Inc., Islandia, NY (US)

( * ) Notice: Subject to any disclaimer, the term of this patent is extended or adjusted under 35 U.S.C. 154(b) by 1289 days.

(21) Appl. No.: 11/837,184

(22) Filed: Aug. 10, 2007

(65) Prior Publication Data

US 2008/0046896 A1 Feb. 21, 2008

(51) Int. Cl.
G06F 9/46 (2006.01)
G06F 9/44 (2006.01)

(52) U.S. Cl. ........................................ 719/320; 717/106
(58) Field of Classification Search .................... 719/320
See application file for complete search history.

(56) References Cited

U.S. PATENT DOCUMENTS

| | | | | |
|---|---|---|---|---|
| 6,988,273 | B2 * | 1/2006 | Matula et al. | 719/316 |
| 2002/0019971 | A1 * | 2/2002 | Zygmont et al. | 717/1 |
| 2005/0044197 | A1 * | 2/2005 | Lai | 709/223 |
| 2006/0156278 | A1 * | 7/2006 | Reager | 717/104 |

OTHER PUBLICATIONS

A.T.M. Aertsa,*, J.B.M. Goossenaertsb, D.K. Hammera, J.C. Wortmannb "Architectures in context: on the evolution of business, application software, and ICT platform architectures" Mar. 21, 2001; received in revised form Feb. 17, 2003; accepted Jun. 9, 2003.*
CA Unicenter® Asset Portfolio Management r11 (Unicenter APM) Release History and Features; 5 pages, Oct. 2005.
Computer Associates International, Inc. is pleased to announce Unicenter Asset Portfolio Management Formerly Unicenter Argis Solution Suite Product Announcement; 1 page, Oct. 31, 2005.
Unicenter® Argis® Portfolio Asset Management Version 8.0.230 Advanced Search & Reporting Patch; 6 pages, May 8, 2004.
NT-Argis-Incremental Fix 28—Jun. 28, 2004; Solution Document; CA, Transforming IT Management; 9 pages, Jul. 6, 2004.

* cited by examiner

Primary Examiner — Lechi Truong
Assistant Examiner — Abdou Seye
(74) Attorney, Agent, or Firm — Baker Botts L.L.P.

(57) ABSTRACT

A method for dynamic manipulation of a multi-tiered enterprise software application comprises providing a meta-architecture in a presentation tier of a multi-tiered enterprise software application. The meta-architecture comprises at least screen content associated with the software application. The meta-architecture is capable of tying at least two tiers of the multi-tiered enterprise software application together, and allowing the dynamic manipulation of the multi-tiered enterprise software application without at least one of reprogramming the multi-tiered enterprise software application and recompiling source code for the multi-tiered enterprise software application. The method concludes by storing the meta-architecture in a database repository.

5 Claims, 2 Drawing Sheets

META-ARCHITECTURE FOR MULTI-TIERED ENTERPRISE SOFTWARE APPLICATION AND SYSTEM

TECHNICAL FIELD OF THE INVENTION

This invention relates generally to information handling systems and, more particularly, to a meta-architecture for multi-tiered enterprise software application.

BACKGROUND OF THE INVENTION

Conventional database management systems (DBMS) contain "system tables" that hold object definitions for tables, fields, indexes, and the like. However, the scope of the conventional object definitions does not expand beyond the database tier. Moreover, the conventional database management systems (DBMS) do not conceal the proprietary language and syntax of any database management systems (DBMS) utilized as a backend repository.

Examples of problems with conventional architectures for conventional database management systems (DBMS) include relationship types and relationship examples. For example, concerning relationship types, conventional system tables do a good job of storing information about tables, fields, and indexes, and the like. This information has proven beneficial when developing the application programming interface (API) tier and graphic user interface (GUI) tier. There are some limitations, however, when it comes to information about the classes and attributes in the application programming interface (API) tier and how the classes and attributes relate to tables and fields in the database (DB) tier. For example, there are two relationships between database (DB) objects and application programming interface (API) objects currently modeled in a conventional architecture. The first relationship is the link between a class and the table the class represents. The second relationship is the link between an attribute and the field the attribute represents. Storing the class and attribute values in a field record indicates that these class-table and attribute-field relationships are one-to-one, when in reality the relationships are many-to-one. Similar concerns exist for relationship examples.

SUMMARY

In accordance with the present invention, the disadvantages and problems associated with traditional systems have been substantially reduced or eliminated.

According to various illustrative embodiments of the present invention, a method for dynamic manipulation of a multi-tiered enterprise software application comprises providing a meta-architecture in a presentation tier of a multi-tiered enterprise software application. The meta-architecture comprises at least screen content associated with the software application. The meta-architecture is capable of tying at least two tiers of the multi-tiered enterprise software application together; and allowing the dynamic manipulation of the multi-tiered enterprise software application without at least one of reprogramming the multi-tiered enterprise software application and recompiling source code for the multi-tiered enterprise software application. The method further comprises storing the meta-architecture in a database repository.

The invention has several important technical advantages. Various embodiments of the invention may have none, some, or all of these advantages. The system and method disclosed herein are advantageous in providing business applications that provides dynamic manipulation of a multi-tiered enterprise software application without the need for reprogramming and/or recompiling source code. The system and method disclosed herein are further advantageous in providing a scope of the object definitions that expands beyond the database tier. The system and method disclosed herein are also advantageous in providing object definitions that conceal the proprietary language and syntax of any database management systems (DBMS) utilized as a backend repository.

The system and method disclosed herein are still further advantageous in improving the performance of business critical applications and, hence, in improving the user and/or customer experience. Other technical advantages will be apparent to those of ordinary skill in the art having the benefit of the present disclosure and in view of the following specification, claims, and drawings.

BRIEF DESCRIPTION OF THE DRAWINGS

For a more complete understanding of the present invention and for further features and advantages, reference is now made to the following description taken in conjunction with the accompanying drawings in which.

DETAILED DESCRIPTION OF THE DRAWINGS

Figure 1:
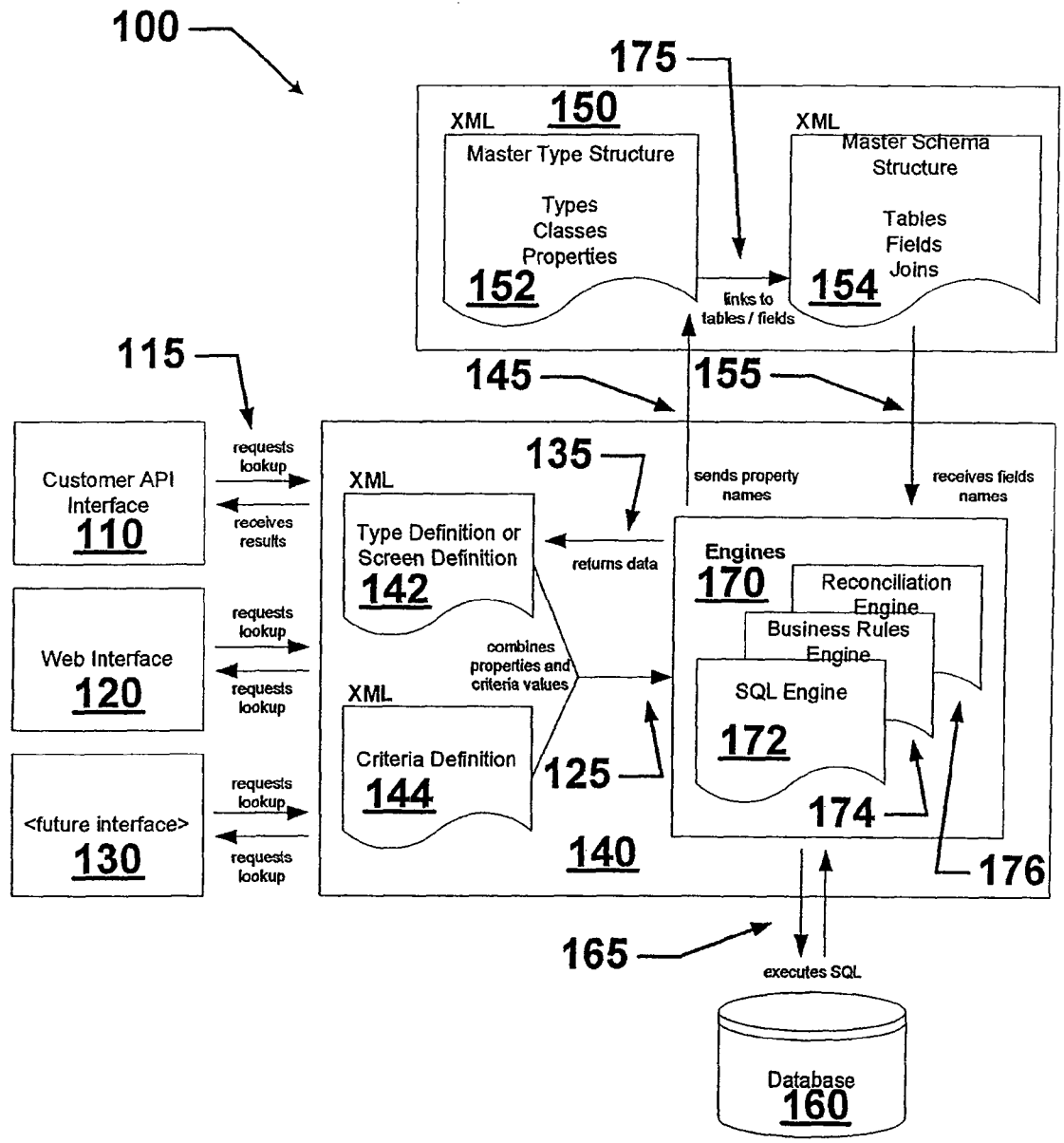
FIG. 1 schematically illustrates a system useful for dynamic manipulation of a multi-tiered enterprise software application in various illustrative embodiments according to the present disclosure.

FIG. 1 illustrates a meta-architecture system 100 for dynamic manipulation of a multi-tiered enterprise software application. System 100 comprises at least one customer application programming interface (API) 110, at least one web interface 120, and/or at least one future interface 130 capable of exchanging information, as indicated at 115, with an information processing system 140. The information processing system 140 may be capable of exchanging information with a master structure system 150, as indicated at 145 and 155, and with at least one database (DB) 160, as indicated at 165.

The information processing system 140 may comprise an extensible markup language (XML) type definition and/or screen definition component 142 and an extensible markup language (XML) criteria definition component 144. The information processing system 140 may also comprise an engine repository 170, comprising at least one structured query language (SQL) engine 172, at least one business rules engine 174, and at least one reconciliation engine 176.

The master structure system 150 may comprise an extensible markup language (XML) master type structure component 152 and an extensible markup language (XML) master schema structure component 154. The extensible markup language (XML) master type structure component 152 may comprise master type structure information relating to types, classes, and properties. The extensible markup language (XML) master schema structure component 154 may comprise master schema structure information relating to tables, fields, and joins.

In various illustrative embodiments, the customer application programming interface (API) 110 may request lookups from the information processing system 140 and/or may receive results from the information processing system 140, as indicated at 115. Similarly, the web interface 120 may request lookups from the information processing system 140 and/or may receive lookup requests from the information processing system 140, as indicated at 115. Likewise, the future interface 130 may request lookups from the information processing system 140 and/or may receive lookup requests from the information processing system 140, as indicated at 115.

In various illustrative embodiments, within the information processing system 140, the extensible markup language (XML) type definition and/or screen definition component 142 and the extensible markup language (XML) criteria definition component 144 may combine properties and criteria values and send the combination of the properties and criteria values to the engine repository 170, as indicated at 125. The engine repository 170 may return data to either the extensible markup language (XML) type definition and/or screen definition component 142 and/or the extensible markup language (XML) criteria definition component 144, as indicated at 135, for example.

In various illustrative embodiments, the engine repository 170 of the information processing system 140 may send property names to the extensible markup language (XML) master type structure component 152 of the master structure system 150, as indicated at 145. Similarly, the information processing system 140 may receive field names from the extensible markup language (XML) master schema structure component 154 of the master structure system 150, as indicated at 155. Within the master structure system 150, the extensible markup language (XML) master type structure component 152 may send links to tables and/or fields to the extensible markup language (XML) master schema structure component 154, as indicated at 175.

In various illustrative embodiments, the engine repository 170 of the information processing system 140 may communicate with the database (DB) 160 by executing structured query language (SQL) statements, as indicated at 165. In various particular illustrative embodiments, the structured query language (SQL) engine 172 of the engine repository 170 of the information processing system 140 may communicate with the database (DB) 160 by executing structured query language (SQL) statements, as indicated at 165.

Figure 2:
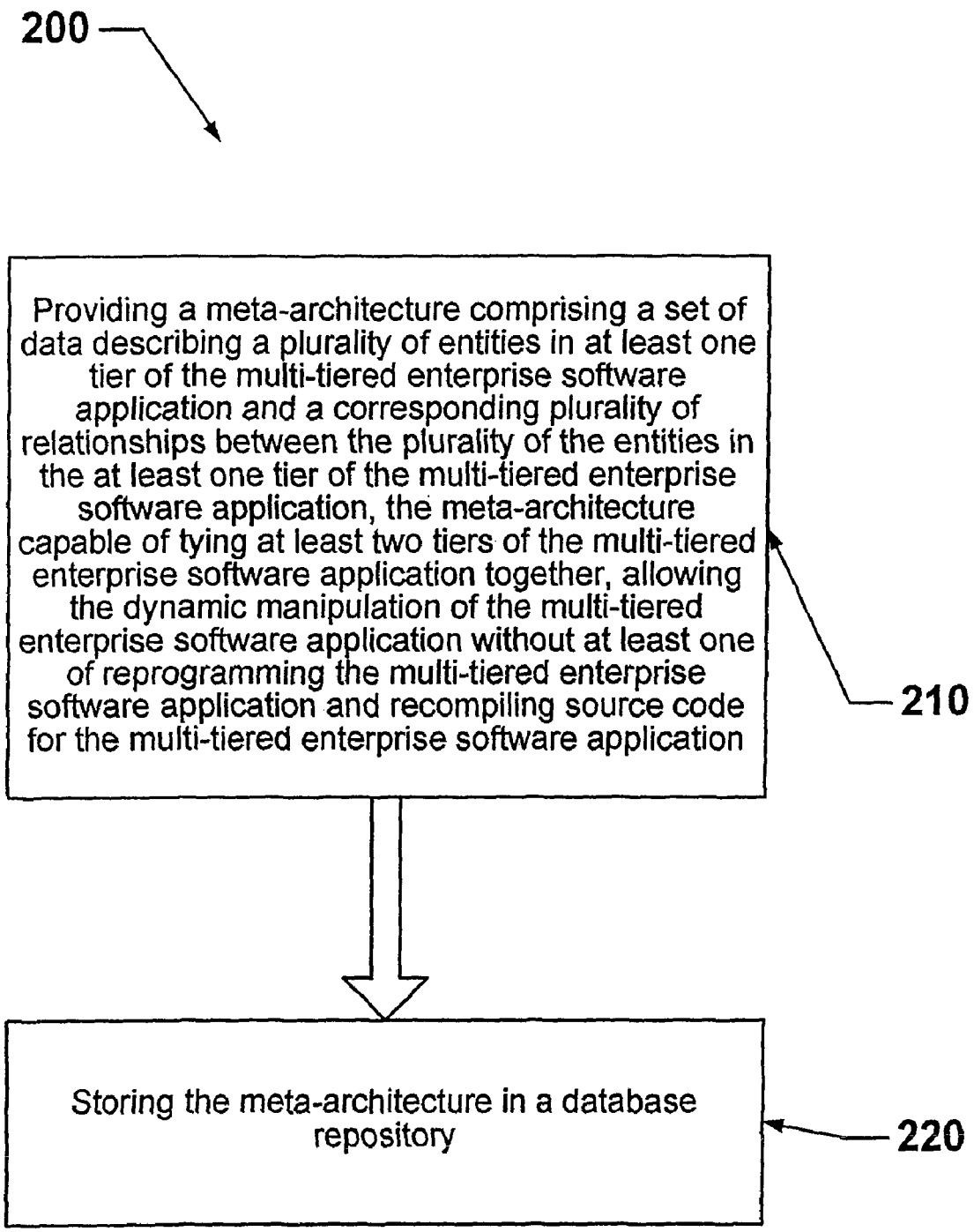
FIG. 2 schematically illustrates a method for dynamic manipulation of a multi-tiered enterprise software application in various illustrative embodiments according to the present disclosure.

In various illustrative embodiments, as shown in FIG. 2, a method 200 for dynamic manipulation of a multi-tiered enterprise software application may be provided. The method 200 may comprise providing a meta-architecture comprising a set of data describing a plurality of entities in at least one tier of the multi-tiered enterprise software application and a corresponding plurality of relationships between the plurality of the entities in the at least one tier of the multi-tiered enterprise software application, the meta-architecture capable of tying at least two tiers of the multi-tiered enterprise software application together, allowing the dynamic manipulation of the multi-tiered enterprise software application without at least one of reprogramming the multi-tiered enterprise software application and recompiling source code for the multi-tiered enterprise software application, as indicated at 210. The method 200 may also comprise storing the meta-architecture in a database repository, as indicated at 220.

In various illustrative embodiments, methods and systems according to the present disclosure enable business applications that provides dynamic manipulation of a multi-tiered enterprise software application without the need for reprogramming and/or recompiling source code. In addition, in various illustrative embodiments, one or more of the following may be provided: (1) Support for Screen Painter that has the ability to add/change/remove screen elements and functionality, (2) Dynamic Database (DB) Extension that has the ability to add/remove tables to the database (DB) in order to extend the application's business value for specific customer requirements with total transparency of the underlying database (DB) functions involved, and/or (3) Dynamic Application Extension that has the ability to extend the software application with data contained in other product's tables and/or customer-created tables without code modifications.

In various illustrative embodiments, a method and a system for dynamic manipulation of a multi-tiered enterprise software application are provided. The method may comprise providing a meta-architecture comprising a set of data describing a plurality of entities in at least one tier of the multi-tiered enterprise software application and a corresponding plurality of relationships between the plurality of the entities in the at least one tier of the multi-tiered enterprise software application. The meta-architecture may be capable of tying at least two tiers of the multi-tiered enterprise software application together, allowing the dynamic manipulation of the multi-tiered enterprise software application without reprogramming the multi-tiered enterprise software application and/or recompiling source code for the multi-tiered enterprise software application. The meta-architecture may shield an end-user from the complexities of details of an application customization while preserving functional capabilities of the application customization.

In various illustrative embodiments, the method may also comprise storing the meta-architecture in a database repository. The meta-architecture may offer a centralized location for architecture administration and/or customization between a plurality of products sharing the database repository. The meta-architecture may be data-driven and, hence, may allow seamless integration of customizations to one or more other instances of the multi-tiered enterprise software application.

In various illustrative embodiments, providing the meta-architecture comprising the set of the data describing the plurality of the entities in at least one tier of the multi-tiered enterprise software application and the corresponding plurality of the relationships between the plurality of the entities in at least one tier of the multi-tiered enterprise software application may further comprise providing the meta-architecture comprising the set of the data describing screen content and functionality in a presentation tier of the multi-tiered enterprise software application.

In various illustrative embodiments, systems and methods according to the present disclosure may improve upon conventional database management systems (DBMS) that contain "system tables" that hold object definitions for tables, fields, indexes, and the like, because various illustrative embodiments of the systems and methods according to the present disclosure may expand the scope of the object definitions beyond the database tier and may conceal the proprietary language and/or syntax of any database management systems (DBMS) utilized as a backend database repository. In various illustrative embodiments, table and field definitions in the meta-architecture, for example, may contain attributes relevant to the business application tier and/or the presentation tier. The meta-architecture may also contain object definitions for non-database management system (non-DBMS) objects, such as classes and/or attributes from the business application tier.

In various illustrative embodiments, the meta-architecture may be a set of data that describes the various entities and relationships between entities in the tiers of a software application. For example, at the database tier the meta-architecture may describe tables, columns, indexes, and joins. At the business application tier, the meta-architecture may describe classes and attributes. At the presentation tier, the meta-architecture may describe screen content and functionality. The meta-architecture may also tie the tiers together, for example, describing how classes and/or attributes may relate to tables and/or columns and/or how screens and/or fields may relate to classes and/or attributes. This may allow for the dynamic manipulation of the software application in question without the need for reprogramming and/or recompiling source code.

The meta-architecture may shield the end-user from the complexities of application customization details while at the same preserving the functional capabilities of such customizations.

Examples of enhancements in new architectures for various illustrative embodiments include join definitions, view definitions, class and attribute definitions, and subclass definitions. For example, concerning join definitions, in addition to storing information about the database (DB) tier, the system tables also store information for the joins between tables. Having join information is useful when trying to navigate the database (DB) structure for lookups and/or reporting. To support these goals, the system tables may include join definitions that describe the join and list the fields and values that make up the join. It may also be useful to store a join value on the attribute definition of attributes that represent foreign key sibling classes and/or dependent children classes. Having join information may allow the application programming interface (API) dynamically to navigate the database (DB) structure when working with these attributes.

Similarly, concerning view definitions, another database (DB) object that may be represented in the system definitions are views. Since a view acts like a virtual table, the main view description may be stored in the table definition table. A separate table may store the list of fields that make up the view.

Likewise, concerning class and attribute definitions, to resolve the limitations of conventional architectures, the system definition tables for classes and attributes may be used. These class and attribute definition tables may be able to link multiple times to the definition tables for tables and fields to represent adequately the many-to-one relationships between the two. A class definition may have a table attribute that links the class definition to the table that the class definition represents. An attribute definition may have a field attribute that links the attribute definition to the field that the attribute definition represents. Since a field may be used by more than one attribute, the label value that may be stored with the field definition may be moved to the attribute definition.

Concerning subclass definitions, for example, classes may be used in different types of ways within the system. For example, the attributes displayed on an asset lookup screen, an asset lookup results list, and an asset data screen may all differ from each other. For this reason, it may be useful to define a subclass definition that describes the different uses of a class and the attributes of that class.

In various illustrative embodiments, there may be three basic features that are particularly useful to users of methods and systems for dynamic manipulation of a multi-tiered enterprise software application in accordance with the present disclosure, the three basic features being: (1) Search for Data (to locate existing data), (2) Enter Data (to insert or update data), and (3) Report on Data (to report on existing data). The following describes how the system table meta-architecture in various illustrative embodiments supports these features. For example, the Search for Data may be supported by an Advanced Search feature, the Enter Data may be supported by a Screen Painter feature, and the Report on Data may be supported by an Application Reporter.

Concerning the Advanced Search, for example, a search feature that allows a user to lookup data may have two sub-components. The first sub-component of a search feature may be a list of selectable attributes for which criteria can be specified in order to limit the number of records returned by the search. If more than one record is returned, the second sub-component of a search feature may be a list of lookup results with identifying attributes that further assist the user in selecting a record.

The Advanced Search feature may derive several important benefits from the system table meta-architecture in various illustrative embodiments. For example, a subclass definition that defines an Asset Lookup type may be used to build the list of selectable attributes on the lookup criteria screen. Once attributes have been selected by the user for criteria selection, the attribute definition information may be used as a lookup structured query language (SQL) statement that may be generated to change attributes names into field names and dynamically include joins, if required, for foreign key and/or child classes. Finally, another subclass definition that defines an Asset Lookup Result may be used to build the list of identifying fields that may assist the user in selecting a record.

The system table meta-architecture in various illustrative embodiments may provide mappings between classes and attributes to a much greater extent and with more accurate detail than in conventional systems. Since join information may be hard-coded in each of the applications in which the join information is required, the system table meta-architecture in various illustrative embodiments may also provide greater flexibility and/or the ability to utilize all classes in Advanced Search.

Concerning the Screen Painter, for example, the data entry feature that may allow a user to update records may have several characteristics. First, a data entry screen may typically have more attributes on the data entry screen than a lookup criteria screen and/or a lookup results screen. Second, specific field characteristics for each attribute such as data type, popup, and/or format mask may determine the type and/or style of control used for each attribute. Third, a user may wish to customize certain screens by adding and/or removing fields and/or changing the labels of existing fields.

All of these characteristics may be supported by the system table meta-architecture in various illustrative embodiments. A subclass definition for each screen may define which attributes appear on the screen. Linking from the attribute definition to the field definition may enable the retrieval of the field characteristics that might dictate changes to the screen controls. Allowing the modification of screen subclass definitions may allow for adding and/or removing fields and changing the label value of an attribute may cause the screen labels to change.

Concerning the Application Reporter, for example, the reporting feature may allow a user to locate and summarize data within their system. The Application Reporter may be used as a reporting engine that creates a series of results tables that the user may use to write reports. The Application Reporter may be driven by an attribute file that may describe the database (DB) and all of the joins within the database (DB).

The system table meta-architecture may support the generation of the attribute file. The join definitions may provide the information that may be useful to link fields on foreign key and/or dependent children tables. The subclass definitions may provide the list of fields that should be included in reporting results tables.

Further examples of enhancements in new architectures for various illustrative embodiments may include performance enhancements and database (DB) extendibility. Concerning the performance enhancements, for example, the benefits to the Advanced Search feature may include the ability to turn class and attribute names into table and field names, which can then be used dynamically to build structured query language (SQL) statements with all required joins. The system table meta-architecture may provide the mappings between classes and attributes to a much greater and more accurate detail than is done conventionally. The system table meta-architecture may also provide join information, which does not exist in conventional systems and which is conventionally hard-coded in each of the applications in which the join information is required.

The benefits from a performance perspective may include the opportunity to remove hard-coded lists of attribute names, hard-coded joins and structured query language (SQL) statements in lookups, and hard-coded exceptions to attributes. If enough data is entered into the design of the system tables, many pieces may be modified to be dynamically data driven. With the merging of existing control-specific records in the security tables with the comprehensive data stored in the system table meta-architecture, less processing may be used for security administration, resulting in better performance.

Concerning the database (DB) extendibility, for example, the system table meta-architecture may work with and provide for database (DB) extendibility. As the user creates new classes and attributes, records may be inserted into the system tables and database (DB) tables may be created. Since the extended records may be part of the same system definitions, all features built on the system tables may automatically be able to use the extended tables and may not have to do special processing to navigate to extended data.

Although the present invention has been described in detail, it should be understood the various changes, substitutions, and alterations can be made hereto without departing from the scope of the invention as defined by the appended claims.

What is claimed is:

1. A method for dynamic manipulation of a multi-tiered enterprise software application, the method comprising:
providing a meta-architecture in a presentation tier of a multi-tiered enterprise software application, the meta-architecture comprising at least screen content associated with the software application, and at least classes and attributes associated with the software application, wherein the meta-architecture is capable of:
tying at least two tiers of the multi-tiered enterprise software application together;
allowing the dynamic manipulation of the multi-tiered enterprise software application without at least one of reprogramming the multi-tiered enterprise software application and recompiling source code for the multi-tiered enterprise software application;
storing the meta-architecture in a database repository; and
operating the software application with data contained in tables of other products without performing code modifications of the software application;
wherein the meta-architecture shields an end-user from aspects of an application customization while preserving functional capabilities of the application customization.

2. A method for dynamic manipulation of a multi-tiered enterprise software application, the method comprising:
providing a meta-architecture in a business application tier of a multi-tiered enterprise software application, the meta-architecture comprising at least screen content associated with the software application, and at least classes and attributes associated with the software application, wherein the meta-architecture is capable of:
tying at least two tiers of the multi-tiered enterprise software application together;
allowing the dynamic manipulation of the multi-tiered enterprise software application without at least one of reprogramming the multi-tiered enterprise software application and recompiling source code for the multi-tiered enterprise software application;
storing the meta-architecture in a database repository; and
operating the software application with data contained in tables of other products without performing code modifications of the software application;
wherein the meta-architecture shields an end-user from aspects of an application customization while preserving functional capabilities of the application customization.

3. A method for dynamic manipulation of a multi-tiered enterprise software application, the method comprising:
providing a meta-architecture in at least one tier of the multi-tiered enterprise software application, the meta-architecture comprising a set of data describing a plurality of entities, at least screen content associated with the software application, at least classes and attributes associated with the software application;
providing a plurality of relationships between the plurality of the entities in the at least one tier of the multi-tiered enterprise software application, wherein the meta architecture is capable of:
tying at least two tiers of the multi-tiered enterprise software application together; and
allowing the dynamic manipulation of the multi-tiered enterprise software application without at least one of reprogramming the multi-tiered enterprise software application and recompiling source code for the multi-tiered enterprise software application;
operating the software application with data contained in tables of other products without performing code modifications of the software application;
shielding an end-user from aspects of an application customization while preserving functional capabilities of the application customization; and
storing the meta-architecture in a database repository.

4. The method of claim 3, wherein the at least one tier comprises a business application tier of the multi-tiered enterprise software application.

5. The method of claim 3, wherein the at least one tier comprises a presentation tier of the multi-tiered enterprise software application.

* * * * *

UNITED STATES PATENT AND TRADEMARK OFFICE
CERTIFICATE OF CORRECTION

PATENT NO. : 8,185,915 B2
APPLICATION NO. : 11/837184
DATED : May 22, 2012
INVENTOR(S) : Lee B. Bash et al.

Page 1 of 1

It is certified that error appears in the above-identified patent and that said Letters Patent is hereby corrected as shown below:

On the title page, Item (60), under Related U.S. Application Data, insert --Provisional application No. 60/822,414, filed on Aug. 15, 2006.--

Column 1, line 5, insert the following:

--CROSS-REFERENCE TO RELATED APPLICATION

This application claims the benefit of U.S. Provisional Application No. 60/822,414, filed August 15, 2006.--

Signed and Sealed this
Ninth Day of April, 2013

Teresa Stanek Rea
*Acting Director of the United States Patent and Trademark Office*